United States Patent [19]

Endicott et al.

[11] Patent Number: 6,098,080

[45] Date of Patent: Aug. 1, 2000

[54] COMPUTER SYSTEM, PROGRAM PRODUCT AND METHOD OF COLLECTING INTERNED DATA WITH A MARK SWEEP COLLECTOR

[75] Inventors: John Clarence Endicott, Rochester, Minn.; Elliot Karl Kolodner, Haifa, Israel; Jon Howard Peterson; Robert Carl Seemann, both of Rochester, Minn.

[73] Assignee: International Business Machines Corporation, Armonk, N.Y.

[21] Appl. No.: 09/072,849

[22] Filed: May 5, 1998

[51] Int. Cl.[7] .................................................. G06F 17/30
[52] U.S. Cl. .......................... 707/206; 707/103; 707/205
[58] Field of Search .................................. 707/103, 205, 707/206

[56] References Cited

U.S. PATENT DOCUMENTS

| | | | |
|---|---|---|---|
| 5,321,834 | 6/1994 | Weiser et al. | 395/600 |
| 5,398,334 | 3/1995 | Topka et al. | 707/206 |
| 5,485,613 | 1/1996 | Engelstad et al. | 707/206 |
| 5,530,854 | 6/1996 | Emery et al. | 707/100 |
| 5,577,246 | 11/1996 | Priddy et al. | 707/202 |
| 5,930,807 | 7/1999 | Ebrahim et al. | 707/206 |

OTHER PUBLICATIONS

Boehm, Hans J. et al., "Mostly Parallel Garbage Collection", Proceedings of the ACM SIGPLAN 91 Conference on Programming Language Design and Implementation, (Jun., 1991), Toronto, Ontario, Canada, pp. 157–164.

Gosling, James, et al., The Java™ Language Specification, Reading, MA: Addison–Wesley, pp. 1–825.

"Class java.lang.ref.Reference", http://java.sun.com/products/jdk/1.2api/java.lang.Ref.html.

Doligez, Damien, et al., "Portable Unobstrusive Garbage Collection For Multi–Processor Systems", Conference Record of the Twenty–first Annual ACM Symposium on Principles of Programming Languages, (Jan. 17–21, 1994), Portland, Oregon, pp. 70–83.

Dijkstra, Edsger et al., "On–the–Fly Garbage Collection: An Exercise in Cooperation", Communications of the ACM, (Nov., 1978), pp. 966–975.

Moon, David A., "Garbage Collection in a Large LISP System", Conference Record of the 1984 ACM Symposium on LISP and Functional Programming, (Aug. 6–8, 1984), Austin, Texas, pp. 235–246.

*Primary Examiner*—Jean R. Homere
*Attorney, Agent, or Firm*—Wood, Herron & Evans, L.L.P.; Stephen W. Roth

[57] ABSTRACT

A computer system, program product, and method of collecting interned data utilize an interned indicator for an internable data element that indicates whether such a data element is in fact interned within an intern data structure. By maintaining this information, iteration completely through the intern data structure during collection may be avoided, thereby reducing the overhead and improving the efficiency of the collection process. In addition, a computer system, program product, and method of collecting interned data may also determine during a second stage of a collection cycle whether an interned data element, which was determined to be unreachable during a first stage of the collection cycle, has subsequently been accessed through an intern data structure since the beginning of the first stage of the collection cycle. By making this determination, interned data that has been made reachable as a result of an access through the intern data structure that occurs after the beginning of the first stage of the current collection cycle is prevented from being collected.

33 Claims, 6 Drawing Sheets

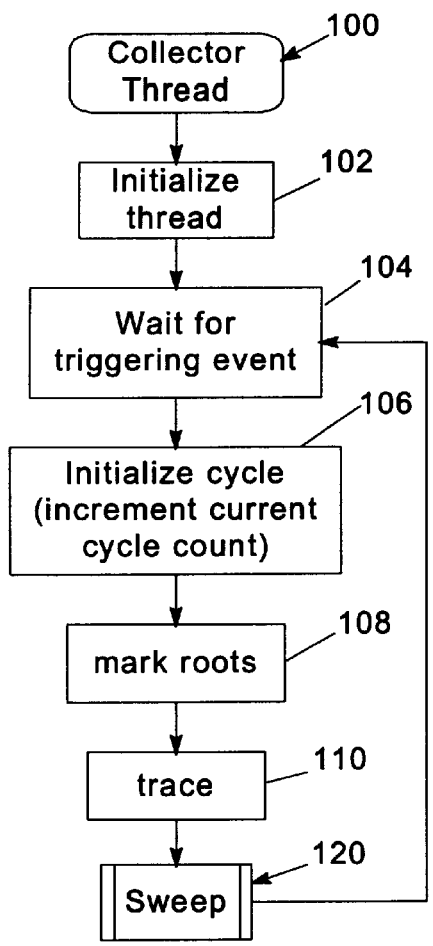
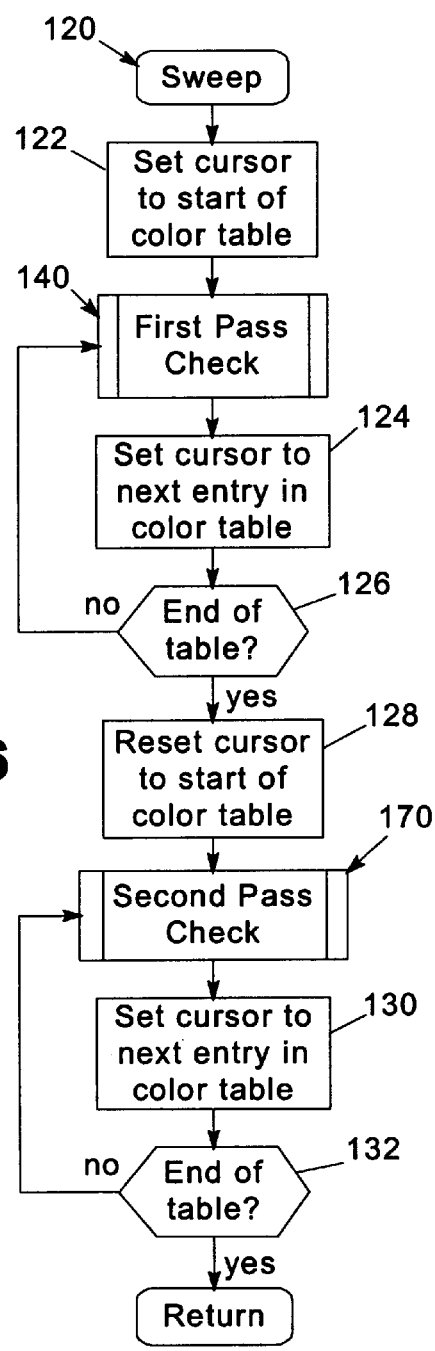
Fig. 5
Fig. 6

COMPUTER SYSTEM, PROGRAM PRODUCT AND METHOD OF COLLECTING INTERNED DATA WITH A MARK SWEEP COLLECTOR

CROSS REFERENCE TO RELATED APPLICATIONS

This application is related to U.S. patent application Ser. No. 09/072,847, filed on even date herewith by John Clarence Endicott et al. and entitled "COMPUTER SYSTEM, PROGRAM PRODUCT AND METHOD OF MANAGING WEAK REFERENCES WITH A CONCURRENT MARK SWEEP COLLECTOR", which application is incorporated by reference herein.

FIELD OF THE INVENTION

The invention is generally related to computers and computer software. More specifically, the invention is generally related to the collection of interned data using a mark sweep collector.

BACKGROUND OF THE INVENTION

Managing available memory is critically important to the performance and reliability of a computer system. Specifically, data used by a computer program is typically stored in a computer system within a memory that has a limited address space. In many computer systems, data is stored in the form of "objects" that are allocated space in a portion of the memory referred to as an "object heap". Objects also often include "references" (also known as pointers) to other objects so that a computer program can access information in one object by following a reference from another object. Typically each computer program has its own object heap, so if multiple computer programs are active in a computer system, multiple object heaps may be maintained in the system.

Whenever new data is to be used by a computer program, a portion of the free memory is reserved for that data using a process known as "allocating" memory. Given that the amount of memory available in a computer system is limited, it is important to free up, or "deallocate", the memory reserved for data that is no longer being used by the computer system. Otherwise, as available memory is used up, the performance of the computer system typically decreases, or a system failure may occur.

A computer program known as a garbage collector is often used to free up unused memory that has been allocated by other computer programs in a computer system. Often, a garbage collector executes concurrently with other computer programs to periodically scan through the object heap(s) and deallocate any memory that is allocated to unused objects (a process also known as "collecting" objects). Different computer programs that operate concurrently in a computer system often include one or more "threads" that execute concurrently with one another. Moreover, when different computer programs use different object heaps, separate garbage collector computer programs, also referred to as collector threads, may be used to manage each object heap.

One specific type of garbage collector is a concurrent mark sweep collector, which sequences repeatedly through individual collection cycles, with each cycle sequentially operating in mark and sweep stages. In the mark stage, the collector scans through an object heap beginning at its "roots", and attempts to "mark" objects that are still are reachable from a root (i.e., that are referenced directly by a root or by a chain of objects reachable from a root). In the sweep stage, the collector scans through the objects and deallocates any memory reserved for objects that are unmarked as of completion of the mark stage.

Concurrent mark sweep collectors are often very desirable for collecting unused data as they often have minimal impact on the responsiveness of program threads. However, by allowing program threads to run concurrently with a collector, a problem arises due to the fact that the program threads could interfere with the work of the collector. This interference could confuse the collector and cause the collector to collect an object that is actually reachable. If a such an object is collected, unexpected behavior may occur, possibly resulting in incorrect behavior and/or in partial or total system failure.

The process of ensuring that data accessed by one computer program in a computer system is not unpredictably affected by the operation of another computer program is generally referred to as "synchronization". Synchronization is typically not a concern for "stop-the-world" garbage collectors, as these types of collectors halt execution of all active program threads during collection, which prevents other program threads from unpredictably modifying data during collection. However, halting all program threads, even for a short time, significantly degrades system performance and degrades the responsiveness of program threads. Thus, "stop-the-world" collectors are typically not as desirable as concurrent collectors, and may not be suitable for many applications.

One specific type of data that may introduce the aforementioned synchronization problem is interned data, which is typically used to speed comparisons between data and reduce storage requirements. Interned data is typically stored and maintained in a data structure such as an intern table, and is processed using a computer function known as an "intern operation". Intern operations may be used, for example, to simplify the determination of the equality of two data elements when equality is based upon the contents of such data elements.

For example, in the Java programming language from Sun Microsystems, intern operations are used to implement the equality semantics for character string literals, which typically consist of an ordered arrangement, or "array", of alphanumeric characters. For example, for the character string literal "grape", the literal is considered to include a string formed by the characters "g", "r", "a", "p" and "e". When called, intern operations in Java typically receive a reference to a string corresponding to a symbol. The intern operation then determines whether the referenced string is already stored in an intern table. If not, the intern operation inserts a table entry for the string into the intern table and returns a reference to the string. If the referenced string is already stored in the intern table, a reference to the stored string is returned without modification to the table. As a result, two strings that have been interned can be compared for equality by comparing the references returned by the intern operations, rather than having to compare the strings on a character-by-character basis.

An interned string typically may be collected, and its entry in the intern table deleted, whenever it is not reachable except for its entry in the intern table. However, collection of interned strings is often problematic due to synchronization concerns with the intern table. An intern table may service multiple computer programs, each of which may include one or more concurrently operating execution threads, or sequences of instructions, that have the ability to independently access the information in the intern table. Accesses to interned strings through an intern table make such strings reachable, and thus unsuitable for collection. As a result, there is a risk that a program thread operating concurrently with a collector will attempt to access an interned string, which was not marked during the mark stage of a collection cycle, during the time period from the beginning of the mark stage of the collection cycle to when the interned string is to be deallocated during the sweep stage. Absent adequate synchronization, the interned string would be collected, thereby introducing possibly unpredictable behavior in the computer system.

Another problem associated with collecting interned data is that an intern table can become large. Iterating through an entire intern table during collection may thus be inefficient and may adversely impact system performance. Moreover, if the intern table is spread out in memory, iterating through the table may result in "page faults" that can further decrease system performance.

Therefore, a significant need exists for an improved manner of efficiently collecting interned data from an intern data structure with a minimal impact on system performance.

SUMMARY OF THE INVENTION

The invention addresses these and other problems associated with the prior art by providing a computer system, program product, and method of collecting interned data that determine during a second stage of a collection cycle whether an interned data element, which was determined to be unreachable during a first stage of the collection cycle, has subsequently been accessed through an intern data structure since the beginning of the first stage of the collection cycle. By making this determination, interned data that has been made reachable as a result of an access through the intern data structure that occurs after the beginning of the first stage of the current collection cycle is prevented from being collected.

In exemplary embodiments of the invention, a concurrent mark sweep collector is utilized, which repeatedly performs collection cycles concurrently with other program threads executing in a computer system. The collection cycles include at least mark and sweep stages that attempt to first identify unreachable objects in an object heap and then collect such objects by deallocating any memory used by such objects. In these embodiments, the determination of whether a previously determined unreachable interned data element has subsequently been used is performed by comparing a current collection cycle indicator with an interned cycle indicator associated with the interned data element.

A collection cycle indicator is utilized to identify each collection cycle as it is being performed, and as such, the current collection cycle indicator represents the collection cycle indicator of the current collection cycle as of the time of the determination. The interned cycle indicator represents the value of the then current collection cycle indicator as of the last time that the interned data element was accessed through the intern data structure, typically via an intern operation performed on the data element. By comparing these indicators, it may be determined whether a last intern operation performed on the interned data element occurred during the current or a previous collection cycle, and thus, whether it is appropriate to collect the interned data element. However, it should be appreciated that other manners of determining whether a previously determined unreachable interned data element has subsequently been used may be utilized in the alternative.

Therefore, consistent with one aspect of the invention, interned data in an intern data structure is collected using first and second stages of a collection cycle. During the first stage, a plurality of interned data elements that are interned in an intern data structure are analyzed to determine whether any of the interned data elements are reachable. During the second stage, it is determined whether a selected interned data element that was determined to be unreachable during the first stage of the collection cycle has been accessed through the intern data structure since the beginning of the first stage of the collection cycle. If not, the selected interned data element is removed from the intern data structure.

Consistent with another aspect of the invention, interned data in an intern data structure is collected by performing a plurality of collection cycles, including associating a collection cycle indicator with each of the plurality of collection cycles; and during a current collection cycle, by removing an unmarked interned data element from the intern data structure if an interned cycle indicator associated with the interned data element differs from the collection cycle indicator for the current collection cycle.

The invention also addresses other problems associated with the prior art by providing a computer system, program product, and method of collecting interned data that utilize an interned indicator for an internable data element that indicates whether such a data element is in fact interned within an intern data structure. By maintaining this information, iteration completely through the intern data structure during collection may be avoided, thereby reducing the overhead and improving the efficiency of the collection process.

Therefore, consistent with a further aspect of the invention, data in a heap is collected by analyzing a plurality of data elements in the heap to determine whether any of the data elements are reachable, with the plurality of data elements including at least one internable data element having associated therewith an interned indicator indicating whether the internable data element is interned in an intern data structure; and collecting unreachable data elements from the heap, including determining whether to collect the internable data element based upon whether the internable data element has been determined to be unreachable and whether the interned indicator indicates that the internable data element is interned in the intern data structure.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 5 is a flowchart illustrating the program flow of the collector thread of FIG. 2.

FIG. 6 is a flowchart illustrating the program flow of the sweep routine of FIG. 5.

DETAILED DESCRIPTION

Hardware Environment

Figure 1:
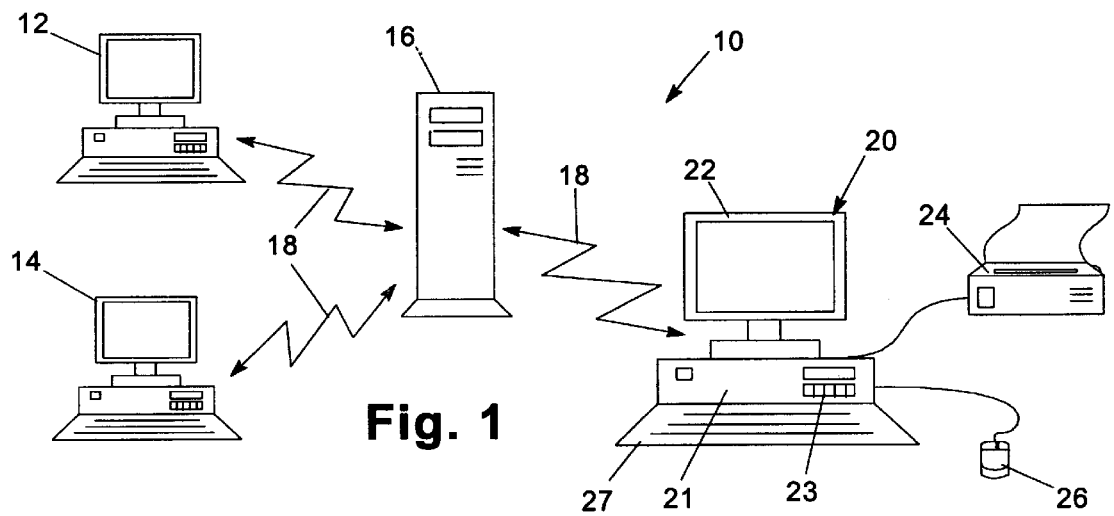
FIG. 1 is a block diagram of a computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
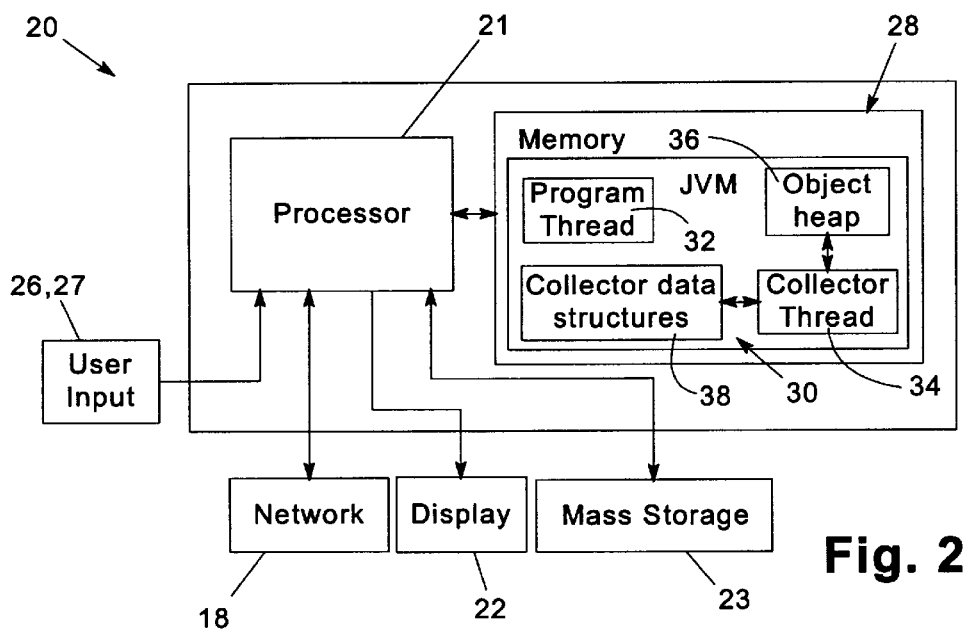
FIG. 2 is a block diagram of an exemplary software environment for the computer system of FIG. 1, illustrating a collector thread consistent with the invention.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

A Java Virtual Machine (JVM) execution module 30 is illustrated as resident in memory 28, and is configured to execute program code on processor 21, e.g., one or more program threads 32, as well as a collector thread 34 that is used to deallocate (or "free up") unused data stored in an object heap 36. Collector thread 34, which is described in greater detail below, also utilizes a plurality of data structures 38 (also described in greater detail below) during its operation. Execution module 30 may be resident as a component of the operating system of computer system 20, or in the alternative, may be implemented as a separate application that executes on top of an operating system. Furthermore, any of execution module 30, program thread 32, collector thread 34, object heap 36 and collector data structures 38 may, at different times, be resident in whole or in part in any of memory 28, mass storage 23, network 18, or within registers and/or caches in processor 21.

It should be appreciated that the various software components may also be resident on, and may execute on, other computers coupled to computer system 10. Specifically, one particularly useful implementation of an execution module consistent with the invention is executed in a server such as an AS/400 midrange computer system from International Business Machines Corporation.

It should be appreciated that other software environments may be utilized in the alternative.

Collecting Interned Data with a Mark Sweep Collector

In the illustrated embodiment, interned strings are collected using a concurrent mark sweep collector that operates in a collector thread concurrently with other program threads executing in the computer system. Performance of the collector thread in collecting unused interned strings is improved by ensuring that an interned string that was indicated to be unmarked (i.e., unreachable) during the mark stage of a collection cycle has not been subsequently accessed through the intern table as of the time at which the unmarked interned string is to be collected during the sweep stage of the collection cycle. It will be appreciated that an access to an interned string through an intern table, e.g., via an intern operation, may result in the interned string becoming reachable from other that the intern table. As a result, unless it is determined whether the interned string has been accessed through the intern table subsequent to the beginning of the mark stage of the current collection cycle, a substantial risk exists that an interned string that is currently in use will be collected.

Interning of strings and/or the use of a concurrent mark sweep collector may be supported in any number of applications, e.g., the Java programming language from Sun Microsystems. However, it should be appreciated that the principles of the invention may also apply to other environments that support interning and/or dynamic garbage collection.

Moreover, while the discussion hereinafter will focus on interning strings, it should be appreciated that the principles of the invention may apply to other types of interned data, including generally any type of data element for which equality may be determined through the content of the data element, e.g., practically any immutable data element such as a character, an integer, a record, a string, an image, etc.

Figure 3:
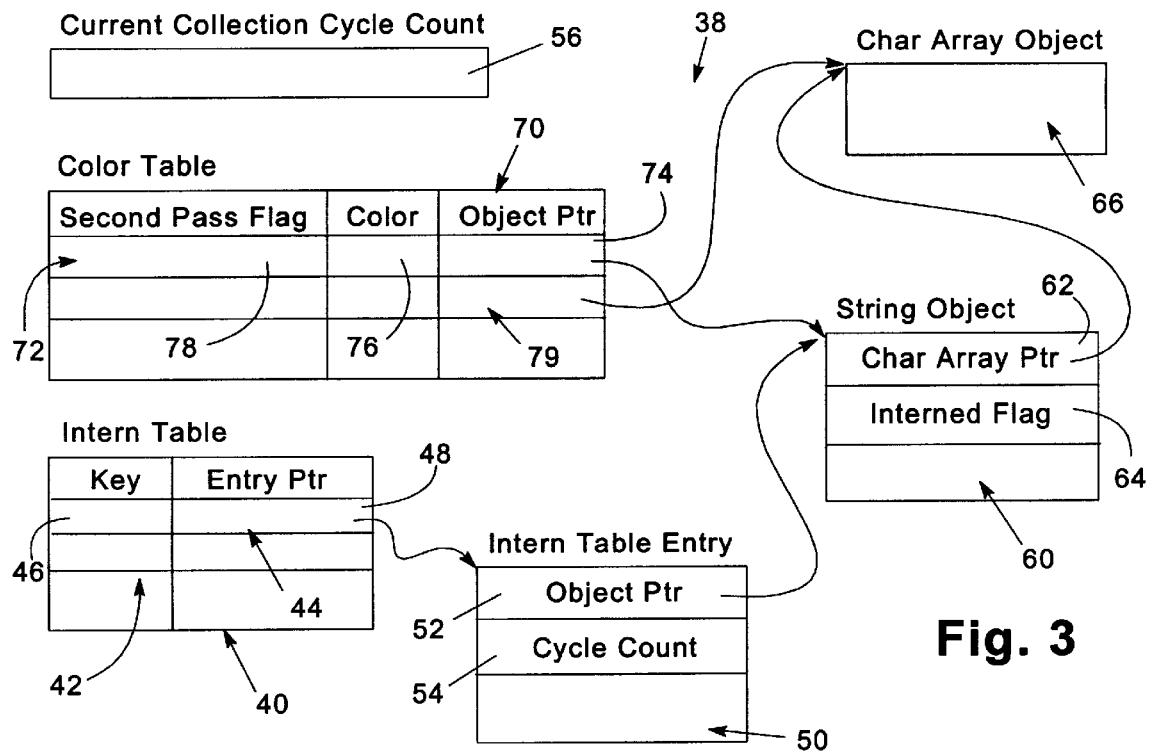
FIG. 3 is a block diagram of intern table, cycle count and color table data structures for use by the collector thread of FIG. 2.

FIG. 3 illustrates several collector data structures at 38 that are utilized by collector thread 34 (FIG. 2) in collecting interned strings. One such data structure is an intern table 40, which has a user visible operation intern( ) defined on it. Intern table 40 includes a plurality of intern table entries 50, each of which includes a reference to a string object 60 which is used, for example, to represent a symbol in Java or a similar language. Among other possible data structures, intern table 40 may be organized as a hash table including a plurality of hash buckets 42. Within each bucket 42 is provided a plurality of slots 44, each including a key field 46 and an entry pointer field 48 having a pointer that points to a specific intern table entry 50.

Each intern table entry 50 includes an object pointer field 52 storing a pointer that points to a specific string object 60. In addition, an interned cycle count, or indicator, is maintained in field 54 of each entry 50 to store a cycle indication that generally represents the most recent collection cycle in which the string object referenced by the entry was last accessed through the intern table, i.e., via an intern operation. As such, a separate current collection cycle count, or indicator 56 is maintained and is updated at the start of each collection cycle with a new cycle indicator. With this configuration, it is possible to determine if an intern string that was previously indicated to be unmarked during the mark stage of the collection cycle has been used subsequent to the beginning of the mark stage by determining if the interned cycle count stored in the intern table entry for such a string is equal to the current collection cycle count 56.

Each string object 60 includes a character array object 66 with an array of characters that represent the string. In addition, each string object 60 also includes an interned bit or flag 64 that indicates whether or not the string object is interned.

Interned flag 64 may be used to indicate whether a string object is interned in an intern table without having to actually access the table. As a result, a check of the interned flag during an attempt to collect a string or other internable object enables any associated intern table entry for the internable object (should the internable object in fact be interned) to also be collected during collection of the object. As a result, the interned flag eliminates the need to iterate through the intern table to determine what strings can be collected.

It should be appreciated that other interned indicators may be used in lieu of a flag, e.g., various numerical or alphanumerical indicators, among others. Moreover, it should be appreciated that interned indicators may also be used in non-concurrent mark sweep collectors (e.g., stop-the-world collectors) to improve the efficiency of garbage collection for an intern data structure. Thus, it should be appreciated that an interned indicator may be used independent of any collection cycle indicator or other manner described herein for ensuring that an interned data element that was determined to be unreachable in a given collection cycle was not subsequently accessed through the intern data structure.

Collector thread 34 also relies on a color table 70 that is used to maintain a record of which objects in an object heap 36 are unused and thus suitable for collection thereby. Color table 70 includes a plurality of entries (e.g., entries 72, 79), each of which includes an object pointer field 74, a color field 76 and a second pass flag field 78. The color table includes an entry for each object in the object heap, with field 74 providing an explicit or implicit reference to one such object. Color field 76 indicates the marked/unmarked status of the object pointed to by the corresponding object pointer field 74. In addition, second pass flag field 78 is used only for character array objects to indicate whether additional processing need be performed during a second pass of the sweep stage of the collection cycle (discussed in greater detail below). For other types of objects, the second pass flag field is not used. Any other data structure or combination of data structures that is capable of providing a one-to-one mapping between an object, a color and a second pass indicator may be used in the alternative.

Mark sweep collectors are generally well known in the art. Typically, a mark sweep collector employs multiple stages that are cycled through repeatedly to collect unused data in an object heap. A first stage starts a collection cycle. Next, a "mark" stage is performed to scan through the object heap and mark any used, or reachable, objects.

Typically, the mark stage is divided into several distinct stages, e.g., a "mark roots" stage and a "trace" stage. The mark roots stage marks the global and local roots in the object heap—that is, any variables that are defined as global or static or that are stored in various stacks and registers within the computer system. The trace stage then marks the objects reachable from other marked objects. The trace stage is complete when all objects that reference marked objects are also marked.

After the mark stage is performed, a "sweep" stage is performed to sweep the object heap and reclaim any unmarked objects. Moreover, during this stage, the marked status of any marked objects is reset to unmarked for the next collection cycle.

When marking objects in a concurrent collection cycle, a four-color marking scheme is typically utilized. A "white" color indicates that an object is unmarked. A "gray" color indicates that an object is marked, but that its direct descendants may not yet be marked (i.e., some may be white). A "black" color indicates that an object is marked and all of its direct descendants are marked (either gray or black). Finally, a "blue" color indicates that the object is on the free list. With this scheme, "gray" or "black" objects are also referred to as "shaded" objects.

Depending upon the language being supported, additional stages may be present in a collector thread. For example, Java may require a "finalize trace" stage between the mark and sweep stages to identify and trace objects ready for finalization. Moreover, it should be appreciated that various algorithms known in the art may be utilized for the various stages in a collector thread. For example, some collector threads repeatedly scan the object heap until there are no gray objects. Other collectors may utilize a Doligez-Gonthier algorithm that repeats a scan only if a newly grayed object is an object that has already been scanned by the current scan. Other collectors may avoid a scan by using a marked stack to hold gray objects. Other algorithms may be used in the alternative.

It should be appreciated that each of data structures 38 may include additional data as necessary for other functionality. Moreover, it should be appreciated that other data structures may be utilized to store the same data in the alternative.

Figure 4:
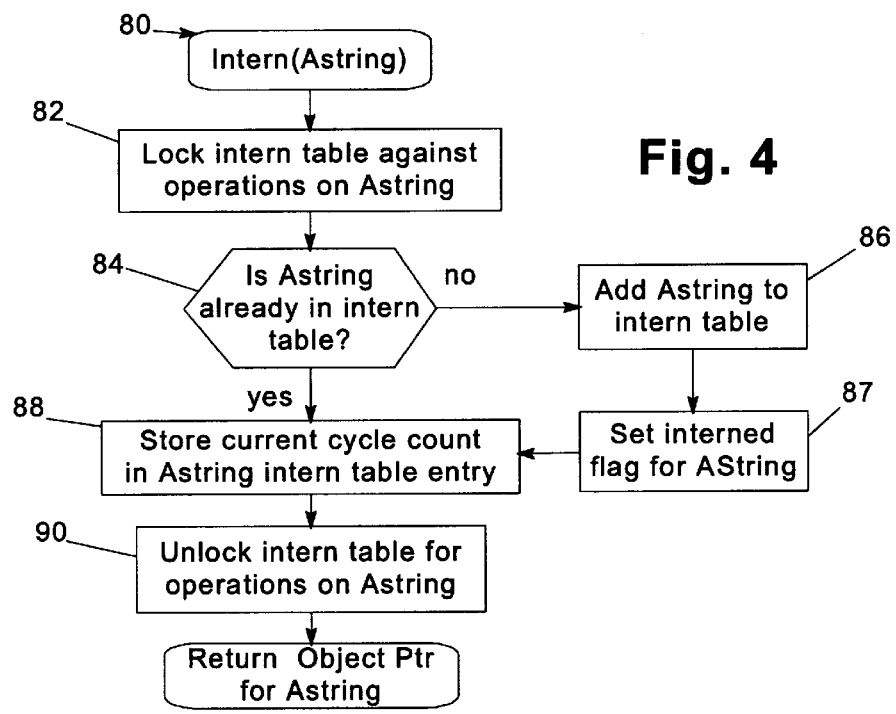
FIG. 4 is a flowchart illustrating the program flow of an intern routine consistent with the invention.

An intern routine 80 suitable for use with collector thread 34 is illustrated in greater detail in FIG. 4. Routine 80 is called in response to an intern operation for a string denoted herein as "Astring". It should be appreciated that an intern operation is typically called by the execution module of a computer system (e.g., by the JVM), or by other program threads in the system through explicit invocation.

Intern routine 80 operates in much the same manner as a conventional intern routine, except that the current collection cycle count is stored as an interned cycle indicator in the intern table entry for the string to be interned as a result of this operation, as well as that an interned flag is set for the string to be interned so that the interned status of the string may readily be determined without accessing the intern table.

Routine 80 is supplied with a reference to Astring as its input as with a conventional intern operation. Routine 80 begins in block 82 by locking the intern table against operations performed on Astring. The intern table may be locked with any degree of granularity. For example, the entire intern table may be locked against access by other program threads, or merely the intern table entry corresponding to Astring may be locked. In the alternative, it is often desirable to provide an intermediate degree of granularity by locking access to the hash bucket 42 in intern table 40 corresponding to the intern table entry for the Astring object. By locking access just to the hash bucket, greater granularity, and thus greater concurrency, is provided as compared to locking the entire intern table. Moreover, the overhead associated with locking just the hash bucket is typically lower than would be required to lock each entry individually.

Next, in block 84, it is determined whether Astring is already in the intern table, e.g., by attempting to locate an intern table entry corresponding to Astring. If no entry is found for Astring, control passes to block 86 to add a new entry 50 for Astring in intern table 40. Next, an interned flag is set for Astring in block 87 to indicate that Astring has been interned.

If an entry exists in the intern table for Astring, or if a new entry is created therefor, control passes to block 88 to store the current cycle count as the interned cycle indicator for the intern table entry for Astring. Next, block 90 unlocks the intern table for operations on Astring, and in block 92, the object pointer stored in field 52 of the entry 50 for Astring is returned as the result of the intern routine. The intern operation is then complete.

The program flow of collector thread 34 is illustrated in greater detail in FIG. 5. Collector thread 34 may operate in basically the same manner as a conventional mark sweep collector, with the exception that a current collection cycle count is maintained therein, and that a modified sweep stage is used to handle the collection of interned sings.

First, in block 102, the collector thread is initialized in a manner known in the art. Next, in block 104, collector thread 34 waits for a triggering event to initiate a new collection cycle for the thread. Rather than running continuously, it should be appreciated that collector thread 34 does not start new collection cycles at arbitrary points. Rather, it may be desirable to wait for certain operations to be completed prior to starting a new collection cycle. One such operation is an intern operation, as it may not be desirable to start a new cycle while a program thread is interning a string. This can be ensured, for example, by using a safe-point mechanism, or a handshake-cooperate mechanism similar to that used in the Doligez-Gonthier collector, among others.

Upon triggering of a new collection cycle, control passes to block 106 to initialize the cycle. As a component of this initialization, the current collection cycle count 56 (FIG. 3) in incremented to indicate a new current cycle. The cycle count may have any range of values. For example, one suitable count is a single byte, whereby 256 cycles may be distinguished. It should also be appreciated that alternate collection cycle indicators that are capable of distinguishing between at least current and previous collection cycles may be used in the alternative. For example, rather than a numeric count, a time stamp or an alphanumeric identifier for each cycle may be used.

Next, in blocks 108 and 110, mark roots and trace stages of the collection cycle are performed to shade all reachable objects in the object heap, each in a manner that is well known in the art. Any number of suitable algorithms (e.g., as discussed above) may be used consistent with the invention.

Next, as illustrated by block 120, a sweep stage routine is performed to collect any unmarked objects in the object heap. Upon completion of the sweep stage, control returns to block 104 to wait for a triggering event to initialize a new collection cycle. A collector thread thus operates in a continuous loop in this manner until the thread is killed, e.g., by shut-down of the execution module via another program thread.

Sweep stage routine 120 is illustrated in greater detail in FIG. 6, and basically operates by performing two passes through color table 70 to determine which objects from the object heap to collect. In a first pass, control passes to block 122 to set a cursor to the start of the color table—that is, to select the first entry in the color table.

Next, a first pass check routine 140 is executed to process the object associated with the first entry in the table. Next, in block 124, the cursor is set to the next entry in the color table, and control then passes to block 126 to determine whether the end of the table, or the last entry therein, has been processed. If not, control returns to block 140 to process the next entry.

Once each entry in the color table has been processed, block 126 passes control to block 128 to initiate a second pass through the color table. Specifically, block 128 resets the cursor to the start of the color table, then calls a second pass check routine 170 to process the object associated with the first entry in the color table. Next, block 130 sets the cursor to the next entry in the color table, and block 132 determines whether the end of the table has been reached. If not, control returns to block 170 to process the next entry. Once each entry in the color table has been processed in the second pass through the color table, the sweep stage is complete.

Figure 7:
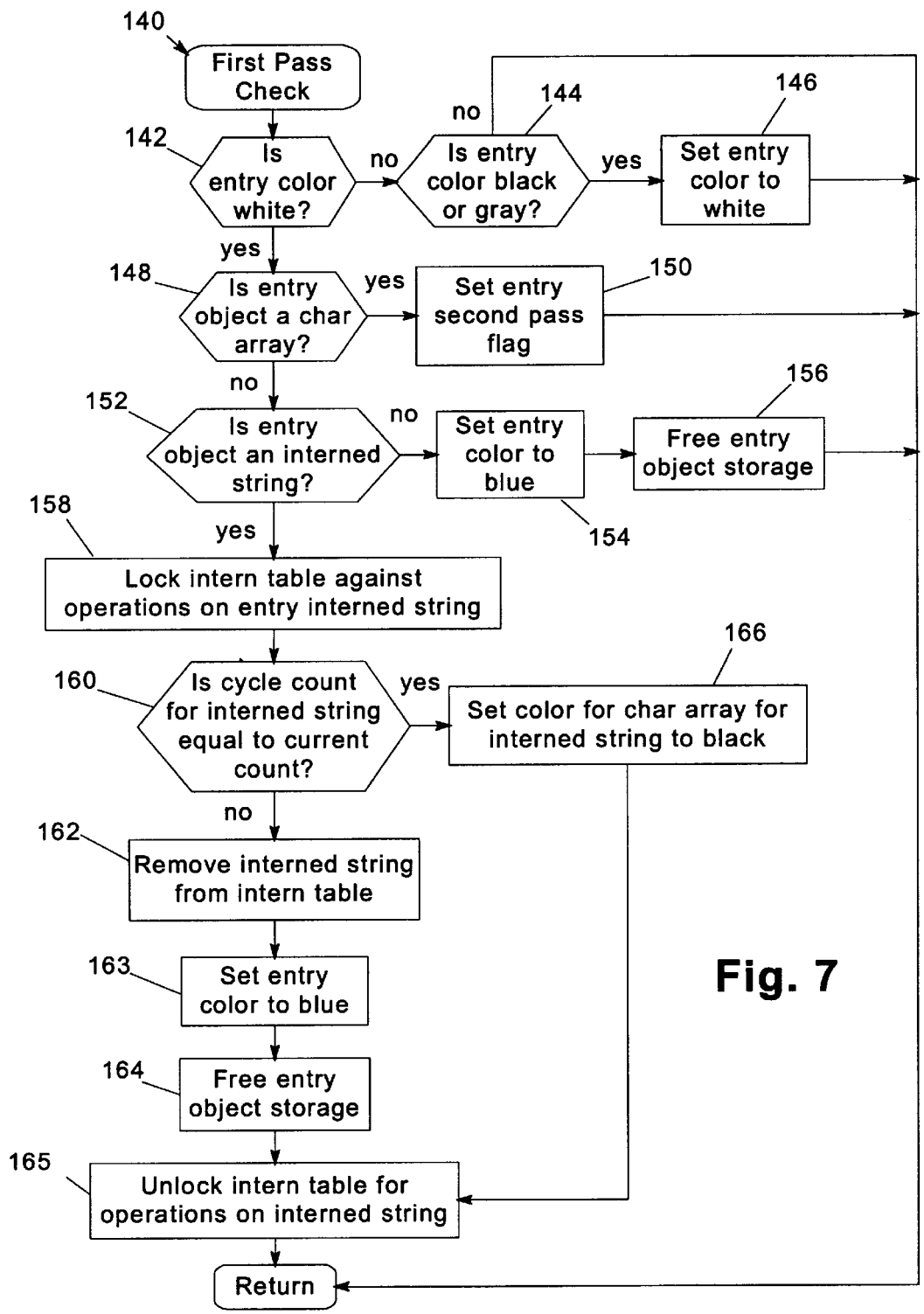
FIG. 7 is a flowchart illustrating the program flow of the first pass check routine of FIG. 6.

FIG. 7 illustrates first pass check routine 140 in greater detail. It is in this routine that the principal sweep operations are performed. The routine begins in block 142 by determining whether the color stored for the current entry is "white", indicating that the entry refers to an unmarked object.

If the entry color is not white, control passes to block 144 to determine whether the color is black or gray. If not, processing of the entry is complete. However, if the color is black or gray, control passes to block 146 to set the entry color to white, whereby the entry is reset to an unmarked state for the next collection cycle. Processing for the entry is then complete.

Returning to block 142, if the entry color is white, control passes to block 148 to determine whether the entry references an object that is a character array. If so, control passes to block 150 to set the second pass flag for the entry so that processing of the character array object is deferred until the second pass through the color table, and routine 140 is then complete.

Returning to block 148, if the entry does not reference a character array object, control passes to block 152 to determine whether the entry references an interned string object, e.g., by determining whether the object is a string, and if so, determining whether the interned flag therefor is set. If not, normal sweep processing is performed. Specifically, control passes to blocks 154 and 156 to set the entry color to "blue" (to indicate that no memory is allocated for the object) and to free up the allocated memory for the object referenced by the entry. Processing of the entry is then complete.

Returning to block 152, if the entry refers to an interned string object, control passes to block 158 to handle the interned string. In block 158, the intern table is locked against operations on the interned string referenced by the entry, in a manner similar to block 82 of intern routine 80 (FIG. 4). Next, block 160 determines whether the interned cycle count stored in the entry in the intern table for the interned string is equal to the current collection cycle count 56. If not, control passes to block 162 to remove the interned string from the intern table, in a manner well known in the art. Next, blocks 163 and 164 set the entry color to blue and free up the allocated memory for the object referenced by the entry. Next, control passes to block 165 to unlock the intern table for operations on the interned string, whereby processing of the entry is complete.

Returning to block 160, if the interned cycle count for the interned string is equal to the current collection cycle count, control passes instead to block 166 to set the color for the character array referenced by the interned string to "black", indicating that the string has been accessed through the intern table in the time period since the beginning of the mark stage of the collection cycle. Control then passes to block 165 to unlock the intern table, whereby processing of the entry is complete.

Figure 8:
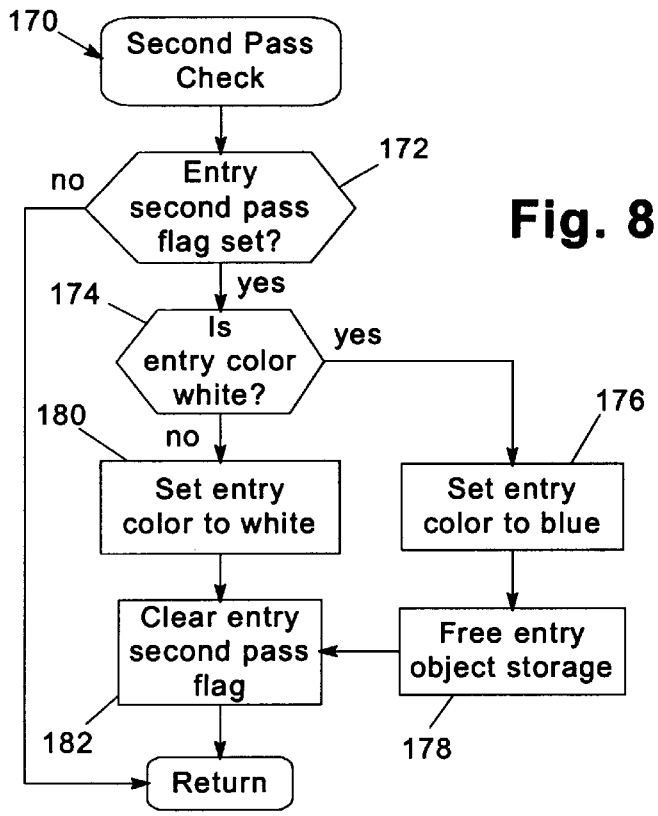
FIG. 8 is a flowchart illustrating the program flow of the second pass check routine of FIG. 6.

FIG. 8 illustrates second pass check routine 170 in greater detail. Routine 170 operates to process each character array having its second pass indicator flag set. Routine 170 begins in block 172 by determining whether the entry being processed has the second pass flag set therefor. If not, routine 170 is finished processing the entry. If, however, the second pass flag is set, control passes to block 174 to determine whether the color for the entry is "white". If so, the object may be collected, so control passes to blocks 176 and 178 to set the color for the entry to "blue" and to free the allocated memory for the object referenced by the entry. Control then passes to block 182 to clear the second pass flag for the entry, and then processing of the entry is complete.

Returning to block 174, if the entry color is not white, control passes to block 180 to reset the entry color to "white", and then to block 182 to clear the second pass flag for the entry. Processing of the entry is then complete.

It should be appreciated that the sweep stage routine described in connection with FIG. 6 is best suited for use with interned strings that utilize character arrays that exist as separate objects in the object heap. In the alternative, it may be desirable to store the characters comprising a string directly within a string object, rather than using a separate object. In this case, an alternate sweep stage may be utilized that operates in a single pass of the color table, rather than the two pass implementation of FIG. 6. In addition, this would also eliminate the need for a second pass flag field in the color table.

Figure 9:
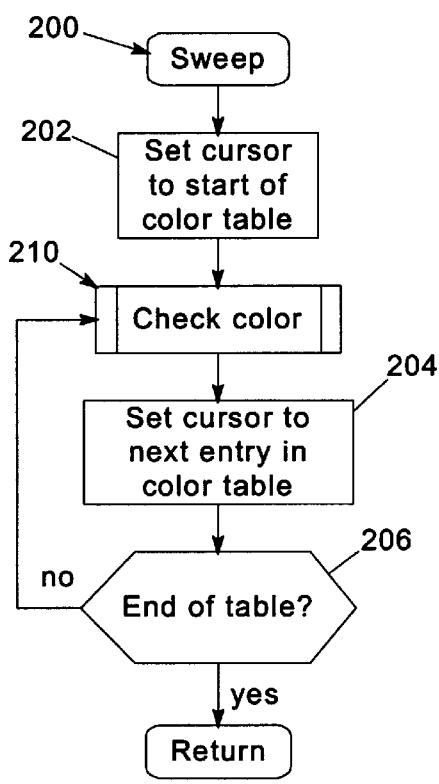
FIG. 9 is a flowchart illustrating the program flow of an alternate sweep routine to that of FIG. 6.

FIG. 9, for example, illustrates an alternate sweep routine 200 that may be utilized as an alternative to routine 120 of FIG. 6 when the characters comprising a string are stored within a string object, rather than in a separate character array object. Routine 200 operates in basically the same manner as the first pass of routine 120, where a cursor is set to point to the start of the color table in block 202, the entry at the start of the color table is processed in a check color routine 210, the cursor is set to the next entry in the color table in block 204, and it is determined whether the end of the table has been reached in block 206. Prior to reaching the end of the table, block 206 again calls routine 210 to process the next entry, and once all entries have been processed, routine 200 terminates.

Figure 10:
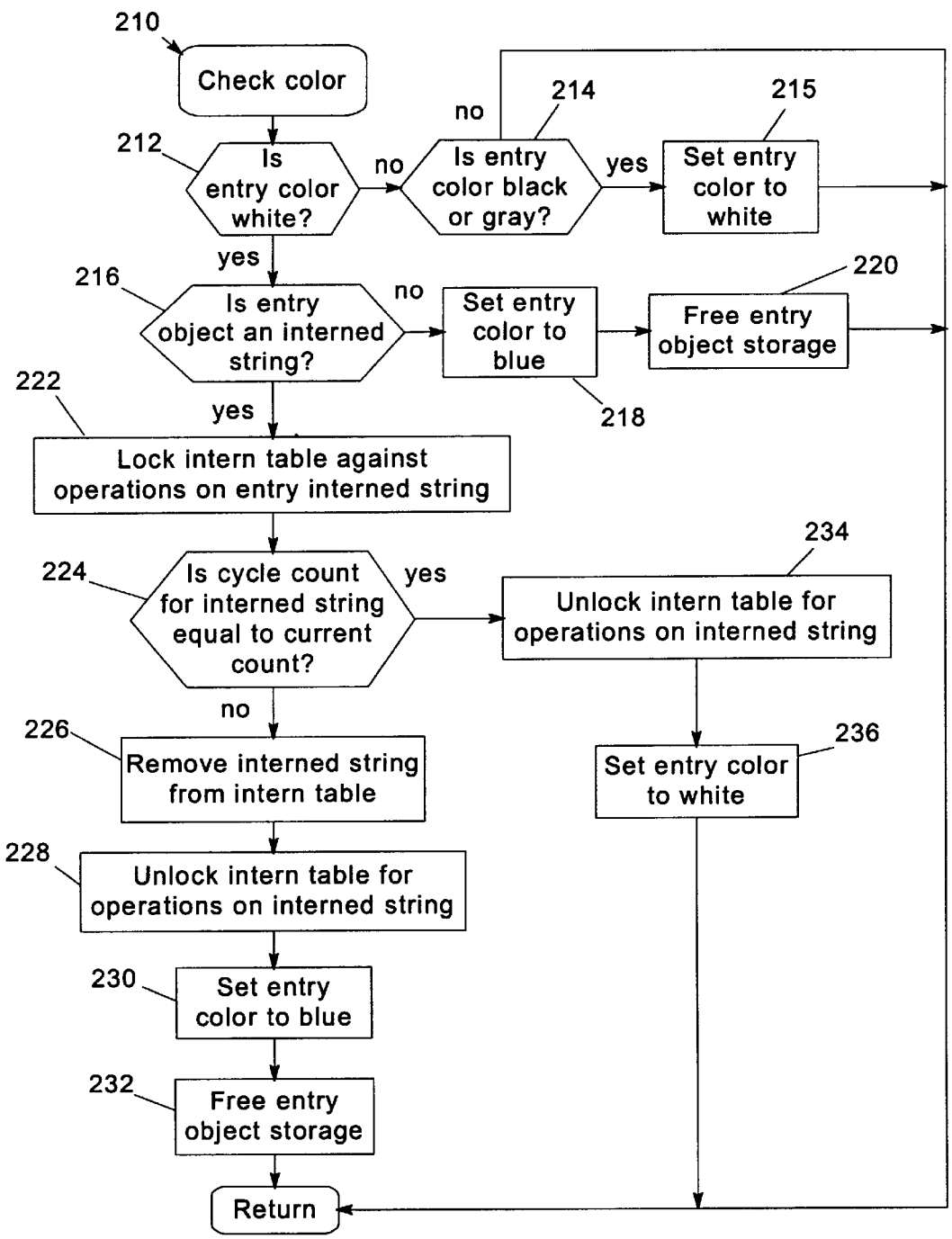
FIG. 10 is a flowchart illustrating the program flow of the check color routine of FIG. 9.

Check color routine 210 is illustrated in greater detail in FIG. 10, and operates in a similar manner to first pass check routine 140 of FIG. 7, albeit with a few modifications based principally upon the lack of separate character array objects in the object heap.

Routine 210 begins in block 212 by determining whether the color stored for the current entry is white, indicating that the entry refers to an unmarked object. If the entry color is not white, control passes to block 214 to determine whether the color is black or gray. If not, processing of the entry is complete. However, if the color is black or gray, control passes to block 215 to set the entry color to white, whereby the entry is reset to an unmarked state for the next collection cycle. Processing for the entry is then complete.

Returning to block 212, if the entry color is white, control passes to block 216 to determine whether the entry references an interned string object. If not, normal sweep processing is performed—specifically, control passes to blocks 218 and 220 to set the entry color to blue and free up the allocated memory for the object referenced by the entry. Processing of the entry is then complete.

Returning to block 216, if the entry refers to an interned string object, control passes to block 222 to handle the interned string. In block 222, the intern table is locked against operations on the interned string referenced by the entry. Next, block 224 determines whether the cycle count stored in the entry in the intern table for the interned string is equal to the current cycle count. If not, control passes to block 226 to remove the interned string from the intern table, in a manner well known in the art. Next, control passes to block 228 to unlock the intern table for operations on the interned string. Next, blocks 230 and 232 set the entry color to blue and free up the allocated memory for the object referenced by the entry, whereby processing of the entry is then complete.

Returning to block 224, if the cycle count for the interned string is equal to the current count, control passes instead to block 234 to unlock the intern table, and then to block 236 to set the entry color to white so that the entry is reset to an unmarked state for the next collection cycle. Processing of the entry is then complete.

Through the use of a cycle indicator, an effective "read barrier" is provided to interned data in such a manner that the overhead and/or decreased performance that is typically associated with synchronization of a concurrently-accessed data structure is minimized. Typically, no extra synchronization beyond that required for any concurrently accessed table is typically required to manage interned strings in the manner described herein. Moreover, given that only a portion of an intern table is typically locked from access during operation of the collector thread, other program threads will continue to run and access interned strings in other portions of the intern table without conflict with the collector thread.

Also, by maintaining an interned cycle indicator in the intern table, analysis of interned data during the sweep stage of a collection cycle is local to a relatively small portion of the intern table, and thus, may minimize the number of page faults associated with processing the interned data. Moreover, with the indicator stored directly in the table, there is no need to perform an additional pass through the entire intern table, which also minimizes page faults. This is in contrast to other collectors such as that provided in the Java programming language, where the intern table must be separately processed with unused entries deleted therefrom prior to the sweep stage of the collection cycle.

In addition, by storing the marked status of objects in a color table, rather than with the actual objects in the object heap, page faults are also minimized since the color table is relatively small and is likely resident in the same page of memory. In the alternative, it may be desirable in other applications to utilize dedicated fields in each object to indicate the marked status of each object.

Moreover, through the use of an interned flag associated with an internable data element, the need to completely iterate through an intern data structure may be avoided, thereby reducing overhead and improving the efficiency of the collection process. The gains in efficiency and reduced overhead are further pronounced when an intern data structure is large and would otherwise generate a relatively large number of page faults as a result of iterating completely through the data structure.

Various additional modifications may be made to the above-described embodiments without departing from the spirit and scope of the invention. Therefore, the invention lies in the claims hereinafter appended.

What is claimed is:

1. A computer-implemented method of collecting data interned in an intern data structure, said intern data structure being stored in memory, the method comprising:

(a) during a first stage of a collection cycle, analyzing a plurality of interned data elements that are interned in an intern data structure to determine whether any of the interned data elements are reachable; and (b) during a second stage of the collection cycle, determining whether a selected interned data element that was determined to be unreachable during the first stage of the collection cycle has been accessed through the intern data structure since the beginning of the first stage of the collection cycle, and if not, removing the selected interned data element from the intern data structure.

2. The method of claim 1, further comprising:

(a) maintaining a current collection cycle indicator that identifies a current collection cycle being performed; and (b) during an intern operation on the selected interned data element being performed during a then current collection cycle, associating with the selected interned data element an interned cycle indicator representative of the current collection cycle indicator for the then current collection cycle.

3. The method of claim 2, wherein determining whether the selected interned data element has been accessed through the intern data structure since the beginning of the first stage of the collection cycle includes comparing the interned cycle indicator associated with the selected interned data element with the current collection cycle indicator for the current collection cycle being performed, and wherein removing the selected interned data element is responsive to the interned cycle indicator associated with the selected interned data element differing from the current collection cycle indicator for the current collection cycle being performed.

4. The method of claim 2, wherein analyzing the plurality of interned data elements includes marking any reachable interned data element.

5. The method of claim 4, wherein the plurality of interned data elements includes an interned string having associated therewith a character array including a plurality of characters for the interned string, and wherein the method further comprises:

(a) during the first stage of a current collection cycle, marking any reachable character array;

(b) during a first pass of the second stage of a current collection cycle, indicating that the character array associated with interned string requires additional analysis if the character array is unmarked;

(c) during the first pass of the second stage of the current collection cycle, marking the character array associated with the interned string if the interned cycle indicator associated with the interned string matches the current collection cycle indicator for the current collection cycle; and (d) during a second pass of the second stage of the current collection cycle, removing the character array associated with the interned string if the character array is still unmarked.

6. The method of claim 5, further comprising, during the second pass of the second stage of the current collection cycle, resetting the character array associated with the interned string to indicate that the character array does not require additional analysis if the character array is marked.

7. The method of claim 5, further comprising synchronizing access to the intern data structure.

8. The method of claim 7, wherein synchronizing access to the intern data structure includes:

(a) restricting access to the interned data element while determining whether the selected interned data element has been accessed through the intern data structure since the beginning of the first stage of the collection cycle;

(b) restricting access to the interned data element while removing the selected interned data element; and (c) restricting access to the interned data element while performing an intern operation on the selected interned data element.

9. The method of claim 2, wherein the first stage is a mark stage and the second stage is a sweep stage.

10. The method of claim 2, wherein the intern data structure includes an intern table, wherein associating the interned cycle indicator with the selected interned data element includes storing the interned cycle indicator in an entry in the intern table that is associated with the selected interned data element, and wherein determining whether the selected interned data element has been accessed through the intern data structure since the beginning of the first stage of the collection cycle includes accessing the entry in the intern table associated with the selected interned data element.

11. The method of claim 1, wherein analyzing the plurality of interned data elements includes indicating a marked or unmarked status for each interned data element in a color table.

12. The method of claim 1, wherein the method is performed concurrently with execution of a second computer program.

13. The method of claim 1, wherein the interned data element is associated with a Java string.

14. The method of claim 1, wherein the interned data element is associated with a symbol.

15. A computer-implemented method of collecting data interned in an intern data structure, said intern data structure being stored in memory, the method comprising:
   (a) performing a plurality of collection cycles, including associating a collection cycle indicator with each of the plurality of collection cycles; and
   (b) during a current collection cycle, removing an unmarked interned data element from the intern data structure if an interned cycle indicator associated with the interned data element differs from the collection cycle indicator for the current collection cycle.

16. The method of claim 15, further comprising, during an intern operation on the interned data element being performed during a then current collection cycle, associating as the interned cycle indicator for the selected interned data element the collection cycle indicator for the then current collection cycle.

17. The method of claim 16, further comprising synchronizing access to the intern data structure.

18. The method of claim 16, wherein the intern data structure includes an intern table, wherein associating the interned cycle indicator with the interned data element includes storing the interned cycle indicator in an entry in the intern table that is associated with the interned data element, and wherein the method further comprises determining whether the interned cycle indicator associated with the interned data element differs from the collection cycle indicator for the current collection cycle by accessing the entry in the intern table associated with the interned data element.

19. The method of claim 15, further comprising indicating a marked or unmarked status for the interned data element in a color table based upon whether the interned data element is reachable.

20. A computer system, comprising:
   (a) a processor; and
   (b) a mark sweep collector configured to be executed on the processor to perform mark and sweep stages of a collection cycle, wherein during the mark stage, the mark sweep collector is configured to analyze a plurality of interned data elements in an intern data structure to determine whether any interned data elements are reachable; and during the sweep stage, the mark sweep collector is configured to determine whether a selected interned data element that was determined to be unreachable during the mark stage has been accessed through the intern data structure since the beginning of the mark stage, and if not, to remove the selected interned data element from the intern data structure.

21. A program product, comprising:
   (a) a program configured to perform a method of collecting data interned in an intern data structure, said intern data structure being stored in memory, the method comprising:
      (1) during a first stage of a collection cycle, analyzing a plurality of interned data elements that are interned in an intern data structure to determine whether any of the interned data elements are reachable; and
      (2) during a second stage of the collection cycle, determining whether a selected interned data element that was determined to be unreachable during the first stage of the collection cycle has been accessed through the intern data structure since the beginning of the first stage of the collection cycle, and if not, removing the selected interned data element from the intern data structure; and
   (b) a signal bearing media bearing the program.

22. The program product of claim 21, wherein the signal bearing media is transmission type media.

23. The program product of claim 21, wherein the signal bearing media is recordable media.

24. A computer-implemented method of collecting data in a heap, said data being stored in memory, the method comprising:
   (a) analyzing a plurality of data elements in a heap to determine whether any of the data elements are reachable, the plurality of data elements including at least one internable data element, the internable data element having associated therewith an interned indicator indicating whether the internable data element is interned in an intern data structure; and
   (b) collecting unreachable data elements from the heap, including determining whether to collect the internable data element based upon whether the internable data element has been determined to be unreachable and whether the interned indicator indicates that the internable data element is interned in the intern data structure.

25. The method of claim 24, wherein the internable data element is an internable object, and wherein the interned indicator is stored in the internable object.

26. The method of claim 24, wherein collecting unreachable data elements from the heap includes collecting the internable data element if the internable data element is determined to be unreachable and the interned indicator indicates that the internable data element is interned in the intern data structure.

27. The method of claim 26, wherein determining whether to collect the internable data element is performed without attempting to access the intern data structure.

28. The method of claim 24, wherein analyzing the plurality of data elements and collecting unreachable data elements are respectively performed in first and second stages of a collection cycle, and wherein determining whether to collect the internable data element is further based upon whether the internable data element has been accessed through the intern data structure since the beginning of the first stage of the collection cycle.

29. The method of claim 28, further comprising:
   (a) maintaining a current collection cycle indicator that identifies a current collection cycle being performed; and
   (b) during an intern operation on the internable data element being performed during a then current collection cycle, associating with the internable data element an interned cycle indicator representative of the current collection cycle indicator for the then current collection cycle;
wherein the determination of whether the internable data element has been accessed through the intern data structure since the beginning of the first stage of the collection cycle is performed by comparing the interned cycle indicator associated with the internable data element with the current collection cycle indicator for the current collection cycle being performed.

30. A computer system, comprising:

(a) a processor; and (b) a mark sweep collector configured to be executed on the processor to collect data in a heap by analyzing a plurality of data elements in the heap to determine whether any of the data elements are reachable, the plurality of data elements including at least one internable data element, the internable data element having associated therewith an interned indicator indicating whether the internable data element is interned in an intern data structure; and by collecting unreachable data elements from the heap, including determining whether to collect the internable data element based upon whether the internable data element has been determined to be unreachable and whether the interned indicator indicates that the internable data element is interned in the intern data structure.

31. A program product, comprising:

(a) a program configured to perform a method of collecting data in a heap, said data being stored in memory, the method comprising:

(1) analyzing a plurality of data elements in a heap to determine whether any of the data elements are reachable, the plurality of data elements including at least one internable data element, the internable data element having associated therewith an interned indicator indicating whether the internable data element is interned in an intern data structure; and (2) collecting unreachable data elements from the heap, including determining whether to collect the internable data element based upon whether the internable data element has been determined to be unreachable and whether the interned indicator indicates that the internable data element is interned in the intern data structure; and (b) a signal bearing media bearing the program.

32. The program product of claim 31, wherein the signal bearing media is transmission type media.

33. The program product of claim 31, wherein the signal bearing media is recordable media.

* * * * *